(12) United States Patent
Okita et al.

(10) Patent No.: US 8,009,213 B2
(45) Date of Patent: Aug. 30, 2011

(54) IMAGE SENSING APPARATUS AND IMAGE CAPTURING SYSTEM

(75) Inventors: Akira Okita, Yamato (JP); Satoshi Suzuki, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 519 days.

(21) Appl. No.: 12/174,844

(22) Filed: Jul. 17, 2008

(65) Prior Publication Data

US 2009/0033781 A1 Feb. 5, 2009

(30) Foreign Application Priority Data

Aug. 2, 2007 (JP) ................................. 2007-202234

(51) Int. Cl.
*H04N 3/14* (2006.01)
*H04N 5/335* (2006.01)
(52) U.S. Cl. ....................................... 348/300; 348/308
(58) Field of Classification Search ........................ None
See application file for complete search history.

(56) References Cited

U.S. PATENT DOCUMENTS

| | | | | |
|---|---|---|---|---|
| 5,886,942 A * | 3/1999 | Akita | | 365/230.06 |
| 5,942,915 A * | 8/1999 | Asada | | 326/81 |
| 6,759,876 B2 | 7/2004 | Inoue et al. | | 326/98 |
| 7,187,052 B2 | 3/2007 | Okita et al. | | 257/444 |
| 7,259,790 B2 | 8/2007 | Mabuchi et al. | | 348/310 |
| 7,283,305 B2 | 10/2007 | Okita et al. | | 359/619 |
| 7,294,818 B2 | 11/2007 | Matsuda et al. | | 250/208.1 |
| 7,321,110 B2 | 1/2008 | Okita et al. | | 250/208.1 |
| 2002/0001037 A1 * | 1/2002 | Miyawaki et al. | | 348/302 |
| 2002/0109160 A1 * | 8/2002 | Mabuchi et al. | | 257/233 |
| 2005/0168618 A1 | 8/2005 | Okita et al. | | 348/335 |
| 2005/0174552 A1 | 8/2005 | Takada et al. | | 355/53 |
| 2005/0179796 A1 | 8/2005 | Okita et al. | | 348/308 |
| 2006/0043393 A1 | 3/2006 | Okita et al. | | 257/93 |
| 2006/0044434 A1 | 3/2006 | Okita et al. | | 348/294 |
| 2006/0157759 A1 | 7/2006 | Okita et al. | | 257/292 |
| 2006/0158539 A1 | 7/2006 | Koizumi et al. | | 348/300 |
| 2006/0158543 A1 | 7/2006 | Ueno et al. | | 348/308 |
| 2006/0208291 A1 | 9/2006 | Koizumi et al. | | 257/292 |
| 2006/0208292 A1 | 9/2006 | Itano et al. | | 257/292 |
| 2006/0221667 A1 | 10/2006 | Ogura et al. | | 365/149 |
| 2007/0109879 A1 * | 5/2007 | Mabuchi | | 365/190 |
| 2007/0278533 A1 | 12/2007 | Mabuchi et al. | | 257/230 |
| 2008/0174688 A1 | 7/2008 | Okita et al. | | 348/340 |

FOREIGN PATENT DOCUMENTS

| | | |
|---|---|---|
| CN | 1428935 A | 7/2003 |
| JP | 10-84259 | 3/1989 |
| JP | 2002-217397 A | 8/2002 |
| JP | 2002-280883 A | 9/2002 |
| JP | 2007/36934 A | 2/2007 |

* cited by examiner

*Primary Examiner* — Lin Ye
*Assistant Examiner* — Dennis Hogue
(74) *Attorney, Agent, or Firm* — Fitzpatrick, Cella, Harper & Scinto

(57) ABSTRACT

An image sensing apparatus comprises a pixel and a driving unit, wherein the driving unit includes a buffer circuit including a first PMOS transistor and a first NMOS transistor, and letting V3 be a voltage supplied to a gate of the first NMOS transistor to supply a transfer signal for turning off the transfer MOS transistor to the transfer control line, V4 be a voltage supplied to a gate of the first PMOS transistor to supply a transfer signal for turning on the transfer MOS transistor to the transfer control line, Vthp1 be a threshold voltage of the first PMOS transistor, and Vthn1 be a threshold voltage of the first NMOS transistor, (V2+Vthn1)<V3<V1 and V2<V4<(V1+Vthp1) are satisfied.

6 Claims, 11 Drawing Sheets

IMAGE SENSING APPARATUS AND IMAGE CAPTURING SYSTEM

BACKGROUND OF THE INVENTION

1. Field of the Invention

The present invention relates to an image sensing apparatus and an image capturing system.

2. Description of the Related Art

A general image sensing apparatus comprises pixels each including a photoelectric conversion unit, a charge-voltage converter which converts a signal based on an electric charge accumulated by the photoelectric conversion unit into a voltage, and a transfer MOS transistor which transfers the electric charge accumulated by the photoelectric conversion unit to the charge-voltage converter; and a driving unit which drives the pixels. If the transfer MOS transistor is an NMOS transistor, it is turned off by supplying the ground potential to its gate. With this operation, the photoelectric conversion unit starts a charge accumulation operation.

Under the circumstance, a demand has arisen for widening the dynamic range of each pixel by increasing the saturating signal amount of the photoelectric conversion unit. To meet this demand, Japanese Patent Laid-Open No. 2002-217397 discloses a technique of turning off the transfer MOS transistor by supplying a negative voltage VTXL to its gate.

In the technique disclosed in Japanese Patent Laid-Open No. 2002-217397, the driving unit includes a buffer circuit 30 for supplying a control signal to the gate of the transfer MOS transistor (see FIG. 2). The buffer circuit 30 has an inverter configuration in which an NMOS transistor 32 and PMOS transistor 31 have a common gate and drain. The common gate of the NMOS transistor 32 and PMOS transistor 31 is connected to an input terminal 33, and their common drain is connected to an output terminal 34. A negative voltage (e.g., −1.2V) is supplied to the source of the NMOS transistor 32.

In turning off the transfer MOS transistor (in accumulation), a power supply voltage (e.g., 5V) is supplied to the input terminal 33. With this operation, the voltage between the gate and source of the NMOS transistor 32 becomes equal to the difference (e.g., 6.2V) between the power supply voltage and the negative voltage. An electric field corresponding to the difference between the power supply voltage and the negative voltage is also supplied to the gate insulating film of the NMOS transistor 32.

Assume that the withstand voltage of the gate insulating film of the NMOS transistor 32 is set nearly equal to the difference (e.g., 5V) between the power supply voltage and the ground voltage. In this case, the gate insulating film of the NMOS transistor 32 is applied with an electric field larger than its withstand voltage in turning off the transfer MOS transistor (in accumulation). This may result in damage to the gate insulating film of the NMOS transistor 32.

SUMMARY OF THE INVENTION

The present invention provides an image sensing apparatus and image capturing system which can prevent any damage to the gate insulating films of transistors in a buffer circuit even when the dynamic range of each pixel is widened.

According to the first aspect of the present invention, there is provided an image sensing apparatus which comprises a pixel and a driving unit which drives the pixel, the pixel including a photoelectric conversion unit, a charge-voltage converter which converts a signal based on an electric charge accumulated by the photoelectric conversion unit into a voltage, and a transfer MOS transistor which transfers the electric charge accumulated by the photoelectric conversion unit to the charge-voltage converter, wherein the driving unit includes a buffer circuit configured to supply a transfer signal to a transfer control line connected to a gate of the transfer MOS transistor, the buffer circuit includes a first PMOS transistor having a drain connected to the transfer control line, and a source supplied with a power supply voltage V1, and a first NMOS transistor having a drain connected to the transfer control line and the drain of the first PMOS transistor, and a source supplied with a reference voltage V2 with a sign opposite to a sign of the power supply voltage V1, and letting V3 be a voltage supplied to a gate of the first NMOS transistor to supply a transfer signal for turning off the transfer MOS transistor to the transfer control line, V4 be a voltage supplied to a gate of the first PMOS transistor to supply a transfer signal for turning on the transfer MOS transistor to the transfer control line, Vthp1 be a threshold voltage of the first PMOS transistor, and Vthn1 be a threshold voltage of the first NMOS transistor, (V2+Vthn1)<V3<V1 and V2<V4<(V1+Vthp1) are satisfied.

According to the second aspect of the present invention, there is provided an image capturing system comprises: an image sensing apparatus according to the first aspect of the present invention, an optical system configured to form an image on an image sensing plane of the image sensing apparatus; and a signal processing unit configured to process a signal output from the image sensing apparatus to generate image data.

According to the present invention, it is possible to prevent any damage to the gate insulating films of transistors in a buffer circuit even when the dynamic range of each pixel is widened.

Further features of the present invention will become apparent from the following description of exemplary embodiments with reference to the attached drawings.

DESCRIPTION OF THE EMBODIMENTS

Figure 1:
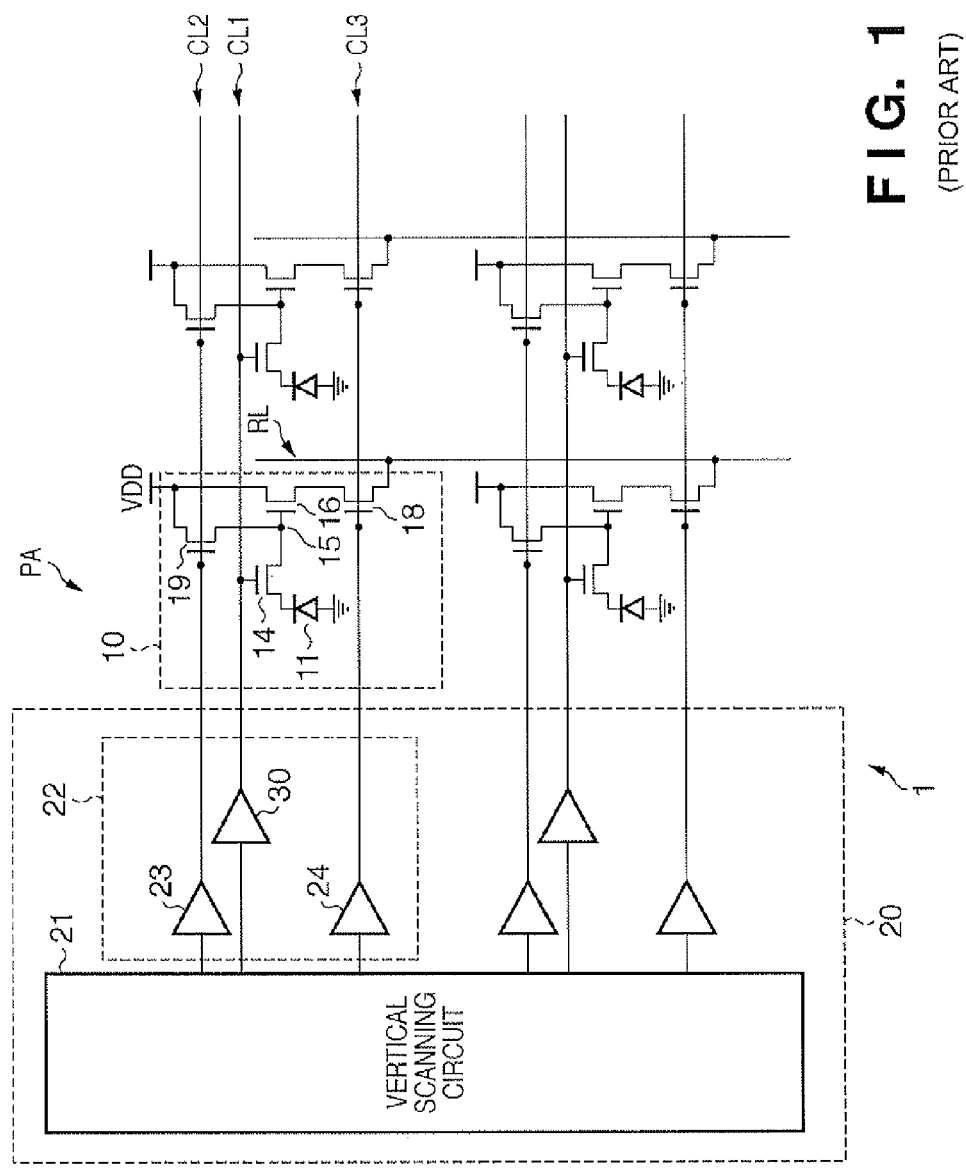
FIG. 1 is a circuit diagram showing the arrangement of an image sensing apparatus 1 to explain the problem to be solved by the present invention.

The problem to be solved by the present invention will be described in detail with reference to FIG. 1. FIG. 1 is a circuit diagram showing the arrangement of an image sensing apparatus 1 to explain the problem to be solved by the present invention.

The schematic arrangement of the image sensing apparatus 1 will be explained first.

The image sensing apparatus 1 comprises a pixel array PA and driving unit 20. In the pixel array PA, a plurality of pixels 10 are arrayed in the row and column directions. The driving unit 20 drives each pixel 10 via a transfer control line CL1, reset control line CL2, selection control line CL3.

The arrangement of each pixel 10 will be explained next with reference to FIG. 1.

Each pixel 10 includes a photoelectric conversion unit 11, charge-voltage converter 15, transfer MOS transistor 14, amplification transistor 16, selection transistor 18, and reset transistor 19. The photoelectric conversion unit 11, charge-voltage converter 15, transfer MOS transistor 14, amplification transistor 16, selection transistor 18, and reset transistor 19 are formed in each well on a semiconductor substrate. A well potential Vwel is fixed to a ground potential Vss.

The photoelectric conversion unit 11 is formed from, for example, a buried photodiode. That is, the photoelectric conversion unit 11 includes a P-type buried layer and N-type buried layer formed in the well. The anode terminal of the photoelectric conversion unit 11 is fixed to the well potential Vwel, and its cathode terminal is connected to the source of the transfer MOS transistor 14.

The charge-voltage converter 15 converts a signal based on an electric charge accumulated by the photoelectric conversion unit 11 into a voltage. The charge-voltage converter 15 is, for example, a floating diffusion (FD) region.

The transfer MOS transistor 14 is an NMOS transistor which is turned on when a power supply voltage V1 (power supply voltage VDD) is supplied to its gate, and which is turned off when a reference voltage V2 (negative voltage VTXL) is supplied to its gate. The power supply voltage V1 is, for example, 5V. The reference voltage V2 has a sign opposite to that of the power supply voltage V1. The reference voltage V2 is, for example, −1.2V. When the transfer MOS transistor 14 is turned on, it transfers an electric charge accumulated by the photoelectric conversion unit 11 to the charge-voltage converter 15. Note that when the transfer MOS transistor 14 is turned on, an electric field corresponding to the difference between the power supply voltage V1 and the well potential Vwel (ground voltage) is supplied to its gate insulating film.

The drain of the amplification transistor 16 is supplied with the power supply voltage VDD. The gate of the amplification transistor 16 receives a signal converted into a voltage from the charge-voltage converter 15. The amplification transistor 16 operates as a source follower in cooperation with constant current source (not shown) connected to a column signal line RL, which outputs a signal corresponding to the input signal (voltage) to the column signal line RL.

The selection transistor 18 selects the pixel 10 in accordance with a signal supplied from the driving unit 20. As the selection transistor 18 selects the pixel 10, it transmits a signal output from the amplification transistor 16 to the column signal line RL.

The drain of the reset transistor 19 is supplied with the power supply voltage VDD. The reset transistor 19 resets the charge-voltage converter 15 to a potential corresponding to the power supply voltage VDD in accordance with a signal supplied from the driving unit 20.

The arrangement of the driving unit 20 will be explained with reference to FIG. 1.

The driving unit 20 includes a vertical scanning circuit 21 and buffer block 22. The vertical scanning circuit 21 drives each pixel 10 via the buffer block 22 and the transfer control line CL1, reset control line CL2, selection control line CL3. The buffer block 22 includes buffer circuits 30, 23, and 24. The buffer circuits 30, 23, and 24 drive signals output from the vertical scanning circuit 21, and respectively output them to the transfer control line CL1, reset control line CL2, and selection control line CL3.

Figure 2:
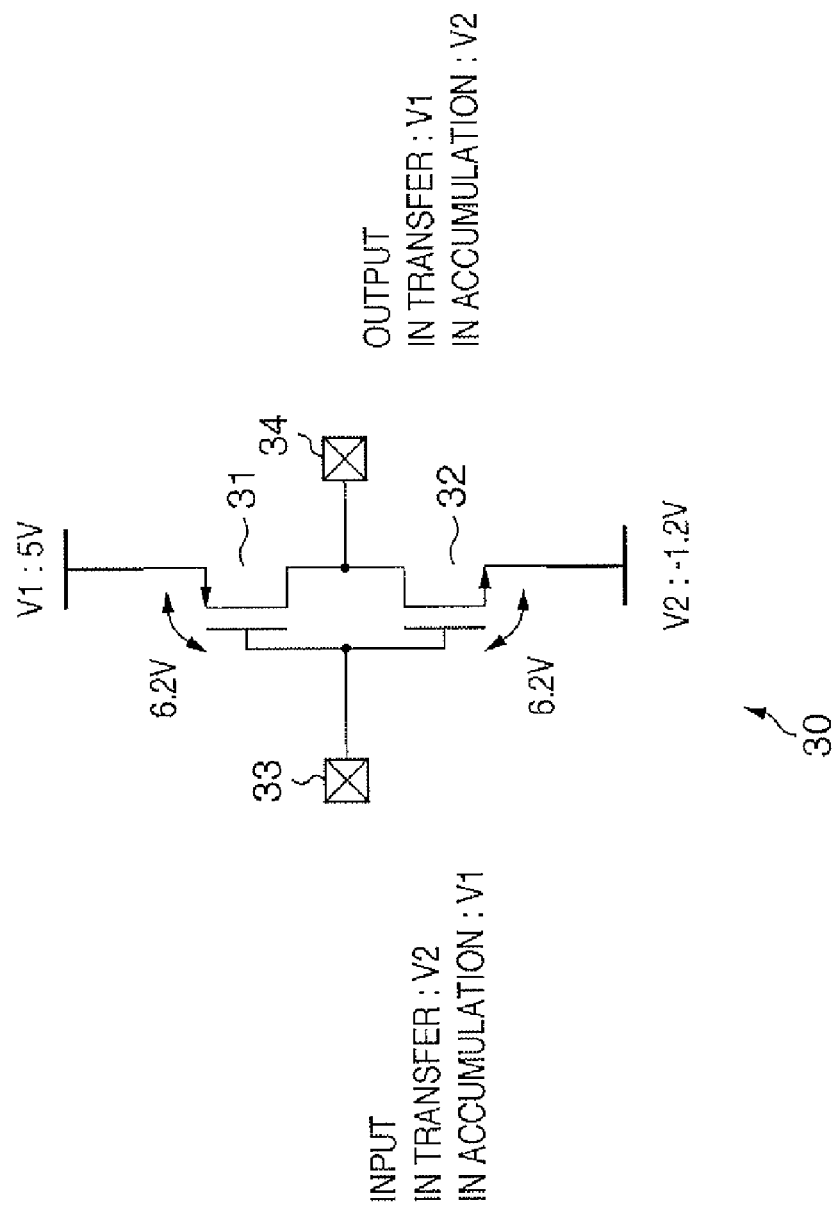
FIG. 2 is a circuit diagram showing the arrangement of a buffer circuit 30 to explain the problem to be solved by the present invention.

The arrangement of the buffer circuit 30 will be explained with reference to FIG. 2. FIG. 2 is a circuit diagram showing the arrangement of the buffer circuit 30 to explain the problem to be solved by the present invention.

The buffer circuit 30 includes a first PMOS transistor 31 and first NMOS transistor 32. The first PMOS transistor 31 has its drain connected to the gate of the transfer MOS transistor 14 via an output terminal 34 and the transfer control line CL1, and its source supplied with the power supply voltage V1. The power supply voltage V1 is, for example, 5V. The first NMOS transistor 32 has its drain connected to the gate of the transfer MOS transistor 14 via the output terminal 34 and transfer control line CL1, and its source supplied with the reference voltage V2. The reference voltage V2 has a sign opposite to that of the power supply voltage V1. The reference voltage V2 is, for example, −1.2V. The drain of the first PMOS transistor 31 is connected to that of the first NMOS transistor 32. The gates of both the first PMOS transistor 31 and first NMOS transistor 32 are connected to an input terminal 33.

The operation of the driving unit 20 will be explained next.

In supplying a transfer signal for turning on the transfer MOS transistor 14 to the transfer control line CL1 (in transfer), the vertical scanning circuit 21 supplies the reference voltage V2 to the buffer circuit 30 of the buffer block 22.

That is, the reference voltage V2 is supplied from the input terminal 33 shown in FIG. 2 to the gates of the first PMOS transistor 31 and first NMOS transistor 32. The first PMOS transistor 31 is turned on, while the first NMOS transistor 32 is turned off. With this operation, the power supply voltage V1 is supplied, as a transfer signal for turning on the transfer MOS transistor 14, from the source of the first PMOS transistor 31 to the output terminal 34 via the drain of the first PMOS transistor 31. The power supply voltage V1 is supplied from the output terminal 34 to the gate of the transfer MOS transistor 14 via the transfer control line CL1. Consequently, the transfer MOS transistor 14 is turned on.

At this time, a voltage Vgs31 corresponding to the difference between the power supply voltage V1 and the reference voltage V2 is generated between the gate and source of the first PMOS transistor 31. When, for example, the power supply voltage V1 is 5V, and the reference voltage V2 is −1.2V, a voltage:

$$Vgs31 = 5V - (-1.2V) = 6.2V \quad (1)$$

is generated.

Assume that the thickness of the gate insulating film of the first PMOS transistor 31 is increased to set its withstand voltage nearly equal to the value represented by equation (1). In this case, the driving capability of the buffer circuit 30 may lower in turning off the transfer MOS transistor 14 (in accumulation). As the driving capability of the buffer circuit 30 lowers, the transfer characteristic of the transfer MOS transistor 14 and the 1/f noise characteristic of the amplification transistor 16 may deteriorate. Still worse, when the thickness of the gate insulating film of the first PMOS transistor 31 is different from those of other transistors, the number of process steps increases. This may result in an increase in manufacturing costs.

Assume also that the withstand voltage of the gate insulating film of the first PMOS transistor 31 is set nearly equal to the difference (e.g., 5V) between the power supply voltage and the ground voltage. In this case, the gate insulating film of the first PMOS transistor 31 is applied with an electric field larger than its withstand voltage in turning on the transfer MOS transistor 14 (in transfer). This may result in damage to the gate insulating film of the first PMOS transistor 31.

In supplying a transfer signal for turning off the transfer MOS transistor 14 to the transfer control line CL1 (in accumulation), the vertical scanning circuit 21 supplies the power supply voltage V1 to the buffer circuit 30 of the buffer block 22.

That is, the power supply voltage V1 is supplied from the input terminal 33 shown in FIG. 2 to the gates of the first PMOS transistor 31 and first NMOS transistor 32. The first PMOS transistor 31 is turned off, while the first NMOS transistor 32 is turned on. With this operation, the reference voltage V2 is supplied, as a transfer signal for turning off the transfer MOS transistor 14, from the source of the first NMOS transistor 32 to the output terminal 34 via the drain of the first NMOS transistor 32. The reference voltage V2 is supplied from the output terminal 34 to the gate of the transfer MOS transistor 14 via the transfer control line CL1. Consequently, the transfer MOS transistor 14 is surely turned off so that a dark current of the photoelectric conversion unit 11 is suppressed. This makes it possible to widen the dynamic range of each pixel 10.

At this time, a voltage Vgs32 corresponding to the difference between the power supply voltage V1 and the reference voltage V2 is generated between the gate and source of the first NMOS transistor 32. When, for example, the power supply voltage V1 is 5V, and the reference voltage V2 is −1.2V, a voltage:

$$Vgs32 = 5V - (-1.2V) = 6.2V \quad (2)$$

is generated.

Assume that the thickness of the gate insulating film of the first NMOS transistor 32 is increased to set its withstand voltage nearly equal to the value represented by equation (2). In this case, the driving capability of the buffer circuit 30 may lower in turning off the transfer MOS transistor 14 (in accumulation). As the driving capability of the buffer circuit 30 lowers, the transfer characteristic of the transfer MOS transistor 14 and the 1/f noise characteristic of the amplification transistor 16 may deteriorate. Still worse, when the thickness of the gate insulating film of the first NMOS transistor 32 is different from those of other transistors, the number of process steps increases. This may result in an increase in manufacturing costs.

When, for example, the electric field strength of the gate insulating film of the first NMOS transistor 32 is 5 MV/cm, the thickness of the gate insulating film required to set its withstand voltage to 5V is:

$$5(V) \div 5(MV/cm) = 10 \text{ nm} \quad (3)$$

The thickness of the gate insulating film required to set its withstand voltage to 6V is:

$$6(V) \div 5(MV/cm) = 12 \text{ nm} \quad (4)$$

The driving capability of the first NMOS transistor 32 when the gate insulating film has a thickness of 12 nm is lower than that when the gate insulating film has a thickness of 10 nm.

Assume also that the withstand voltage of the gate insulating film of the first NMOS transistor 32 is set nearly equal to the difference (e.g., 5V) between the power supply voltage and the ground voltage. In this case, the gate insulating film of the first NMOS transistor 32 is applied with an electric field larger than its withstand voltage. This may result in damage to the gate insulating film of the first NMOS transistor 32.

Figure 3:
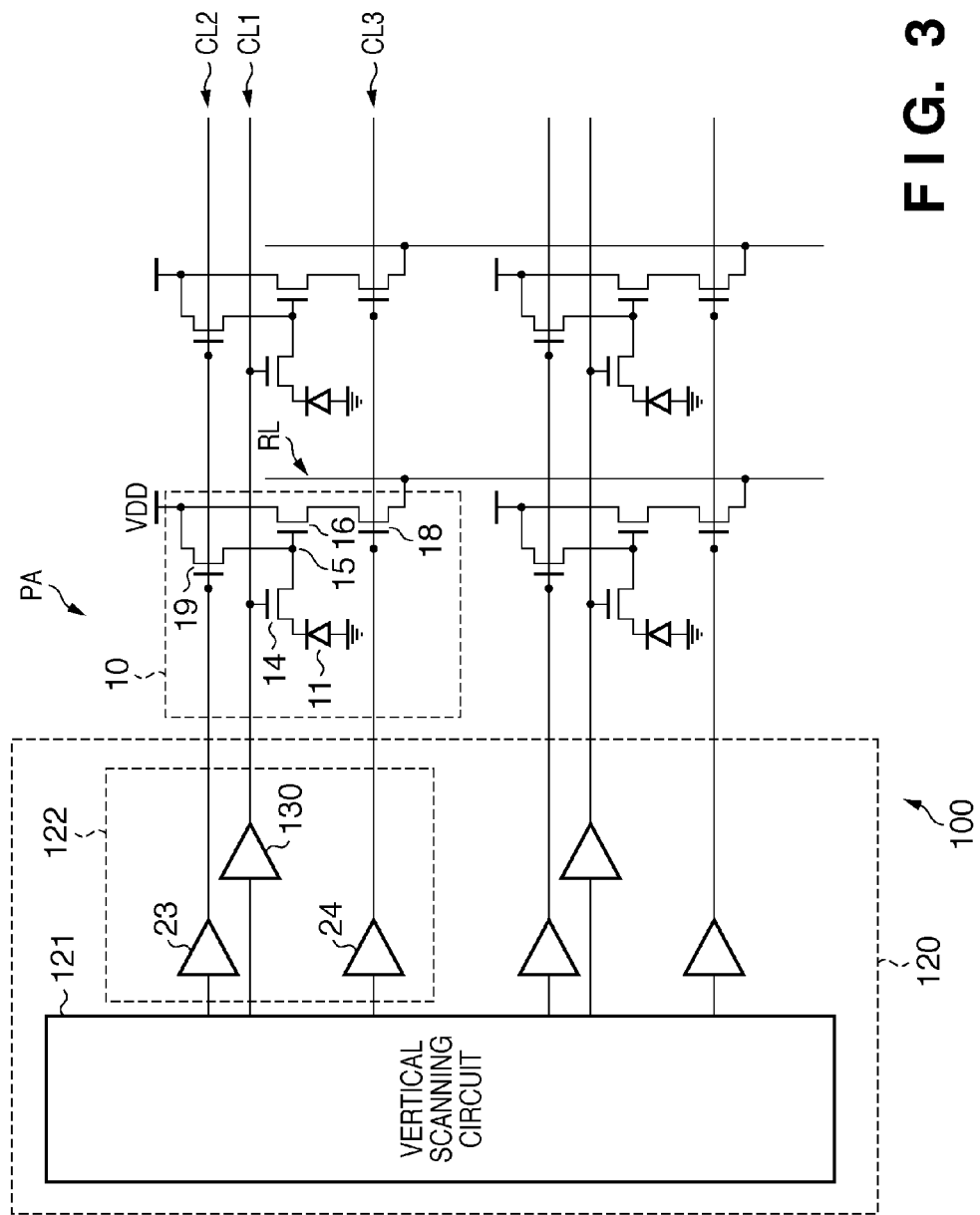
FIG. 3 is a circuit diagram showing the arrangement of an image sensing apparatus 100 according to the first embodiment of the present invention.

An image sensing apparatus 100 according to the first embodiment of the present invention will be explained next with reference to FIG. 3. FIG. 3 is a circuit diagram showing the arrangement of the image sensing apparatus 100 according to the first embodiment of the present invention. Parts different from those in the image sensing apparatus 1 to explain the problem to be solved by the present invention will be mainly described hereinafter, and a description of the same parts will not be given.

Figure 4:
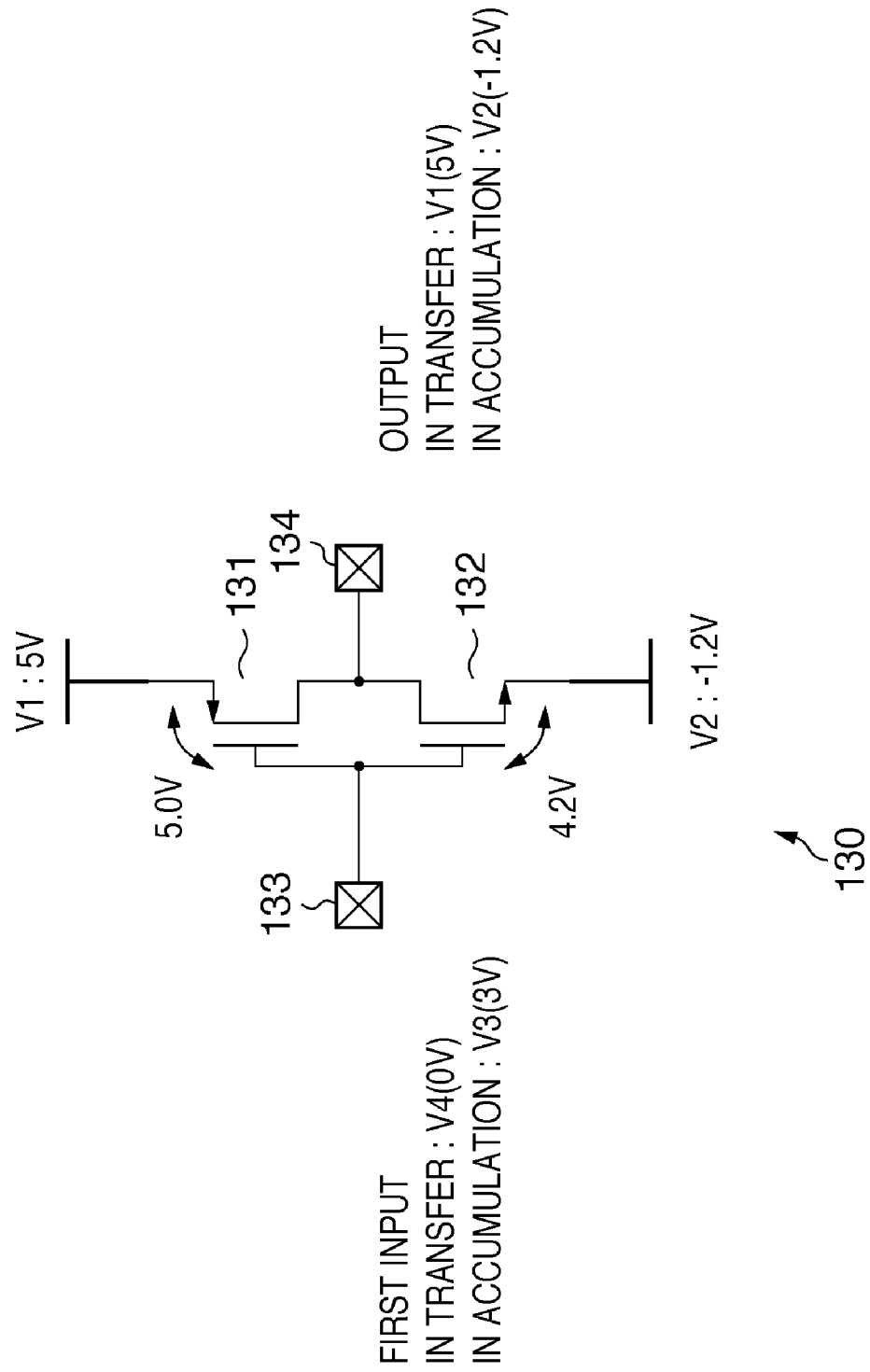
FIG. 4 is a circuit diagram showing the arrangement of a buffer circuit.

The image sensing apparatus 100 comprises a driving unit 120. The driving unit 120 includes a vertical scanning circuit 121 and buffer block 122. The buffer block 122 includes a buffer circuit 130. The buffer circuit 130 includes a first PMOS transistor 131 and first NMOS transistor 132, as shown in FIG. 4. FIG. 4 is a circuit diagram showing the arrangement of the buffer circuit.

The operation of the driving unit 120 is different from that in the driving unit 20 in the following points.

In supplying a transfer signal for turning on a transfer MOS transistor 14 to a transfer control line CL1 (in transfer), the vertical scanning circuit 121 supplies a voltage V4 to the buffer circuit 130 of the buffer block 122. The voltage V4 satisfies:

$$V2 < V4 < (V1 + Vthp1) \quad (5)$$

where Vthp1 is the threshold voltage of the first PMOS transistor 131.

That is, the voltage V4 is supplied from an input terminal 133 shown in FIG. 4 to the gates of the first PMOS transistor 131 and first NMOS transistor 132. The first PMOS transistor 131 is turned on, while the first NMOS transistor 132 is turned off. The power supply voltage V1 is supplied, as a transfer signal for turning on the transfer MOS transistor 14, from the source of the first PMOS transistor 131 to an output terminal 134 via the drain of the first PMOS transistor 131, as in the image sensing apparatus 1.

At this time, a voltage Vgs131 corresponding to the difference between the power supply voltage V1 and the voltage V4 is generated between the gate and source of the first PMOS transistor 131. When, for example, the power supply voltage V1 is 5V, and the voltage V4 is 0V, a voltage:

$$Vgs131 = 5V - 0V = 5V \quad (6)$$

is generated.

The voltage Vgs131 is equal to or less than the withstand voltage (e.g., 5V) of the gate insulating film of the first PMOS transistor 131. For this reason, the thickness of the gate insulating film of the first PMOS transistor 131 need not be increased. This makes it possible to ensure the driving capability of the buffer circuit 130 in turning off the transfer MOS transistor 14 (in accumulation).

Even when the withstand voltage of the gate insulating film of the first PMOS transistor 131 is set nearly equal to the difference (e.g., 5V) between the power supply voltage and the ground voltage, the gate insulating film of the first PMOS transistor 131 can be suppressed from being applied with an electric field larger than its withstand voltage. This makes it possible to prevent any damage to the gate insulating film of the first PMOS transistor 131.

In supplying a transfer signal for turning off the transfer MOS transistor 14 to the transfer control line CL1 (in accumulation), the vertical scanning circuit 121 supplies a voltage V3 to the buffer circuit 130 of the buffer block 122. The voltage V3 satisfies:

$$(V2+Vthn1)<V3<V1 \quad (7)$$

where Vthn1 is the threshold voltage of the first PMOS transistor 131.

That is, the voltage V3 is supplied from the input terminal 133 shown in FIG. 4 to the gates of the first PMOS transistor 131 and first NMOS transistor 132. The first PMOS transistor 131 is turned off, while the first NMOS transistor 132 is turned on. The reference voltage V2 is supplied, as a transfer signal for turning off the transfer MOS transistor 14, from the source of the first NMOS transistor 132 to the output terminal 134 via the drain of the first NMOS transistor 132, as in the image sensing apparatus 1.

At this time, a voltage Vgs132 corresponding to the difference between the voltage V3 and the reference voltage V2 is generated between the gate and source of the first NMOS transistor 132. When, for example, the voltage V3 is 3V, and the reference voltage V2 is −1.2V, a voltage:

$$Vgs132=3V-(-1.2V)=4.2V \quad (8)$$

is generated.

The voltage Vgs132 is equal to or less than the withstand voltage (e.g., 5V) of the gate insulating film of the first NMOS transistor 132. For this reason, the thickness of the gate insulating film of the first NMOS transistor 132 need not be increased. This makes it possible to ensure the driving capability of the buffer circuit 130 in turning off the transfer MOS transistor 14 (in accumulation).

The thickness of the gate insulating film of the first NMOS transistor 132 can be decreased by setting its withstand voltage nearly equal to the value represented by equation (8).

When, for example, the electric field strength of the gate insulating film of the first NMOS transistor 132 is 5 MV/cm, the thickness of the gate insulating film required to set its withstand voltage to 4.2V is:

$$4.2(V) \div 5(MV/cm) = 8.4 \text{ nm} \quad (9)$$

That is, the thickness of the gate insulating film of the first NMOS transistor 132 in this case can be smaller than that required to set its withstand voltage to 5V (see equation (3)). This makes it possible to improve the driving capability of the buffer circuit 130 in turning off the transfer MOS transistor 14 (in accumulation).

Even when the withstand voltage of the gate insulating film of the first NMOS transistor 132 is set nearly equal to the difference (e.g., 5V) between the power supply voltage and the ground voltage, the gate insulating film of the first NMOS transistor 132 can be suppressed from being applied with an electric field larger than its withstand voltage. This makes it possible to prevent any damage to the gate insulating film of the first NMOS transistor 132.

In this manner, even when the dynamic range of each pixel 10 is widened by turning off the transfer MOS transistor 14 by supplying the reference voltage V2 (with a sign opposite to a sign of the power supply voltage V1) to it, the driving capability of the buffer circuit 130 which drives the pixels 10 can be ensured. This makes it possible to prevent any damage to the gate insulating films of the transistors in the buffer circuit 130.

Since the gate insulating films of the transistors in the buffer circuit 130 arranged adjacent to the plurality of pixels 10 can be prevented from being damaged, it is possible to suppress any heat generation and light emission caused when a leakage current flows through the gate insulating films.

If heat generation or luminescence occurs in the gate insulating films of the transistors in the buffer circuit 130, the dark current value of the photoelectric conversion unit 11 in the pixel 10 near the buffer circuit 130 may increase. In this case, a luminance increment which is caused by increasing only an output signal level from pixel near the buffer circuit 130 when sensing a dark object (capturing a dark image) occurs particularly upon accumulation over a long time, resulting in significant deterioration in image quality.

On the contrary, according to the present invention, it is also possible to suppress such luminance increment due to a dark current.

It should be noted that the driving unit 120 may perform the following driving. Let V3n be the voltage supplied to the gate of the first NMOS transistor 132 in supplying a transfer signal for turning off the transfer MOS transistor 14 to the transfer control line CL1. Then, the driving unit 120 may perform driving to further satisfy $$Vthn1 \leq (V3n-V2) \quad (10)$$

That is, when V4 is substituted for V3n in relation (10), according to relation (5), the driving unit 120 performs driving to satisfy $$V2<V2+Vthn1 \leq V4<(V1+Vthp1) \quad (11)$$

in turning off the transfer MOS transistor 14.

Let V4p be the voltage supplied to the gate of the first PMOS transistor 131 in turning on the transfer MOS transistor 14 by supplying the reference voltage V2 to it. Then, the driving unit 120 may perform driving to further satisfy $$(V4p-V1) \leq Vthp1 \quad (12)$$

That is, when V3 is substituted for V4p in relation (12), according to relation (7), the driving unit 120 performs driving to satisfy $$(V2+Vthn1)<V3 \geq V1+Vthp1<V1 \quad (13)$$

in turning on the transfer MOS transistor 14.

The driving unit 120 may perform driving to satisfy $$(V3-V2)=-(V4-V1) \quad (14)$$

The voltage Vgs131 between the gate and source of the first PMOS transistor 131 can be set equal to the value represented by equation (8). This makes it possible to decrease the thickness of the gate insulating film of the first PMOS transistor 131 as well.

The driving unit 120 may perform driving to satisfy $$(V3-V2) \leq (V1-Vwel) \quad (15)$$

and $$-(V4-V1) \leq (V1-Vwel) \quad (16)$$

That is, the thickness of the gate insulating film of the transfer MOS transistor 14 can be limited by a maximum electric field (V1−Vwel) applied to it in transfer.

In other words, the driving unit 120 performs the following driving. Let TWV be the maximum electric field applied to the gate insulating film of the transfer MOS transistor, and BWV1 be the larger value of maximum electric fields applied to the gate insulating films of the first PMOS transistor 131 and first NMOS transistor 132. Then, the driving unit 120 performs driving to satisfy $$BWV1 \leq TWV \tag{17}$$

Particularly when the driving unit 120 performs driving to satisfy $$(V3-V2)=-(V4-V1)=(V1-Vwel) \tag{18}$$

it is possible to achieve a good transfer characteristic of the image sensing apparatus 100 and improve the driving capability of the buffer circuit 130.

When an operating power supply VDD2 or the like in the logic portion of a vertical scanning circuit unit uses a voltage of, for example, 3.3V, which is lower than a power supply voltage VDD in the buffer portion, the voltage V3 and the voltage of the operating power supply VDD2 may be used simultaneously. This makes it possible to decrease the number of circuits for generating the voltage V3 in the vertical scanning circuit 121 so that even the layout area can be reduced.

Figure 5:
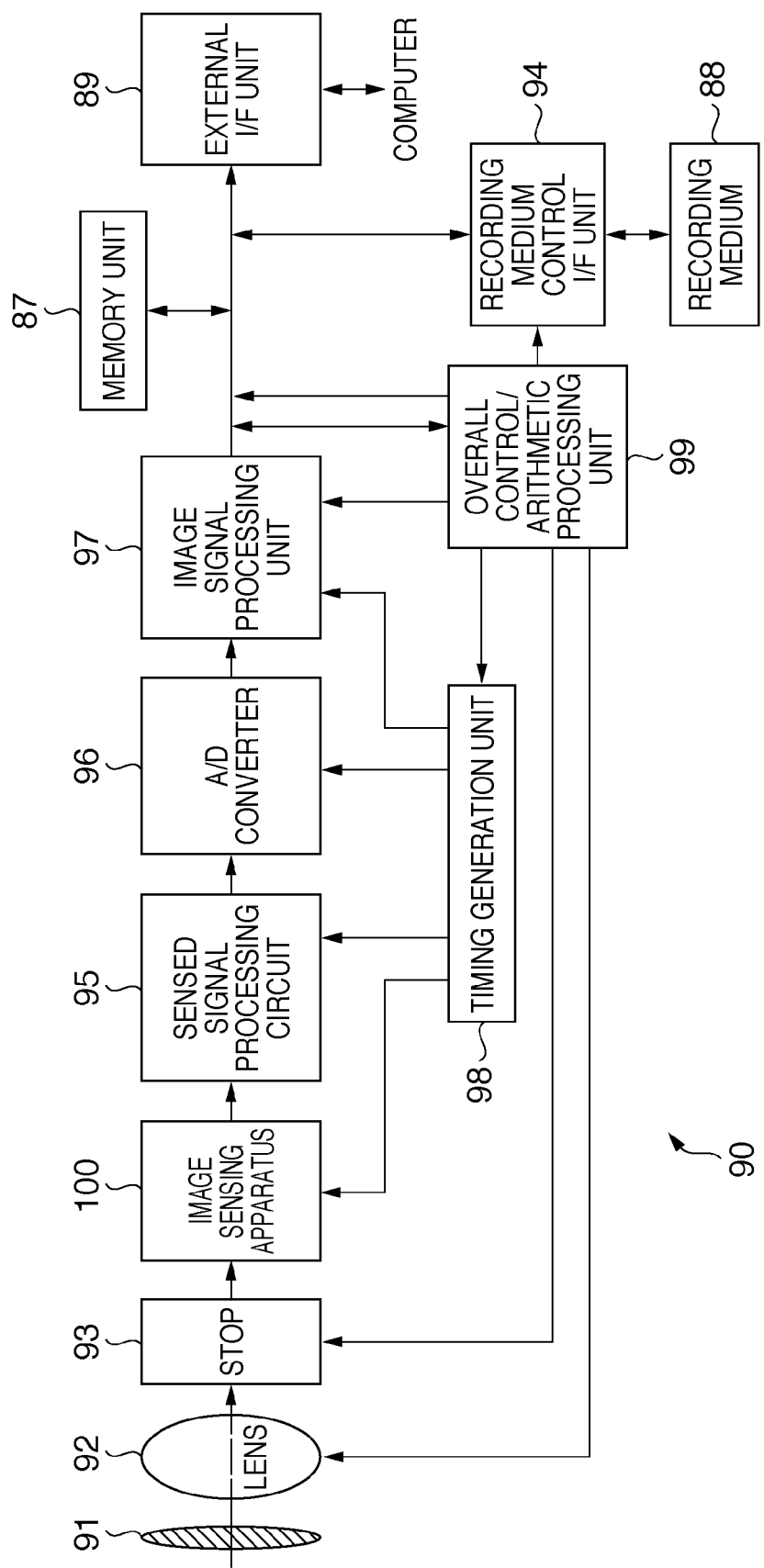
FIG. 5 is a block diagram showing the configuration of an image capturing system to which the image sensing apparatus according to the first embodiment is applied.

FIG. 5 illustrates an example of an image capturing system to which an image sensing apparatus according to the present invention is applied.

An image capturing system 90 mainly comprises an optical system, image sensing apparatus 100, and signal processing unit, as shown in FIG. 5. The optical system mainly comprises a shutter 91, photographing lens 92, and stop 93. The signal processing unit mainly comprises an sensed signal processing circuit 95, A/D converter 96, image signal processing unit 97, memory unit 87, external I/F unit 89, timing generation unit 98, overall control/arithmetic processing unit 99, recording medium 88, and recording medium control I/F unit 94. The signal processing unit need not always comprise the recording medium 88.

The shutter 91 is inserted immediately before the photographing lens 92 in the optical path, and controls exposure.

The photographing lens 92 refracts incident light to form an object image on the image sensing plane of the image sensing apparatus 100.

The stop 93 is arranged between the photographing lens 92 and the image sensing apparatus 100 in the optical path, and adjusts the amount of light which is guided to the image sensing apparatus 100 after propagating through the photographing lens 92.

The image sensing apparatus 100 converts an object image formed in a pixel array into an image signal. The image sensing apparatus 100 reads out the image signal from the pixel array, and outputs the readout image signal (analog signal).

The sensed signal processing circuit 95 is connected to the image sensing apparatus 100, and processes the image signal output from the image sensing apparatus 100.

The A/D converter 96 is connected to the sensed signal processing circuit 95, and converts the processed image signal (analog signal) output from the sensed signal processing circuit 95 into a image signal (digital signal).

The image signal processing unit 97 is connected to the A/D converter 96, and performs arithmetic processes such as various types of correction for the image signal (digital signal) output from the A/D converter 96 to generate image data. This image data is supplied to, for example, the memory unit 87, external I/F unit 89, overall control/arithmetic processing unit 99, and recording medium control I/F unit 94.

The memory unit 87 is connected to the image signal processing unit 97, and stores the image data output from the image signal processing unit 97.

The external I/F unit 89 is connected to the image signal processing unit 97. The image data output from the image signal processing unit 97 is transferred to an external device (e.g., a personal computer) via the external I/F unit 89.

The timing generation unit 98 is connected to the image sensing apparatus 100, sensed signal processing circuit 95, A/D converter 96, and image signal processing unit 97. Timing signals are supplied to the image sensing apparatus 100, sensed signal processing circuit 95, A/D converter 96, and image signal processing unit 97. Then, the image sensing apparatus 100, sensed signal processing circuit 95, A/D converter 96, and image signal processing unit 97 operate in synchronism with the timing signals.

The overall control/arithmetic processing unit 99 is connected to the timing generation unit 98, image signal processing unit 97, and recording medium control I/F unit 94, and systematically controls the timing generation unit 98, image signal processing unit 97, and recording medium control I/F unit 94.

The recording medium 88 is detachably connected to the recording medium control I/F unit 94. The image data output from the image signal processing unit 97 is recorded on the recording medium 88 via the recording medium control I/F unit 94.

With the above-described arrangement, a satisfactory image (image data) can be obtained as long as the image sensing apparatus 100 obtains a satisfactory image signal.

Figure 6:
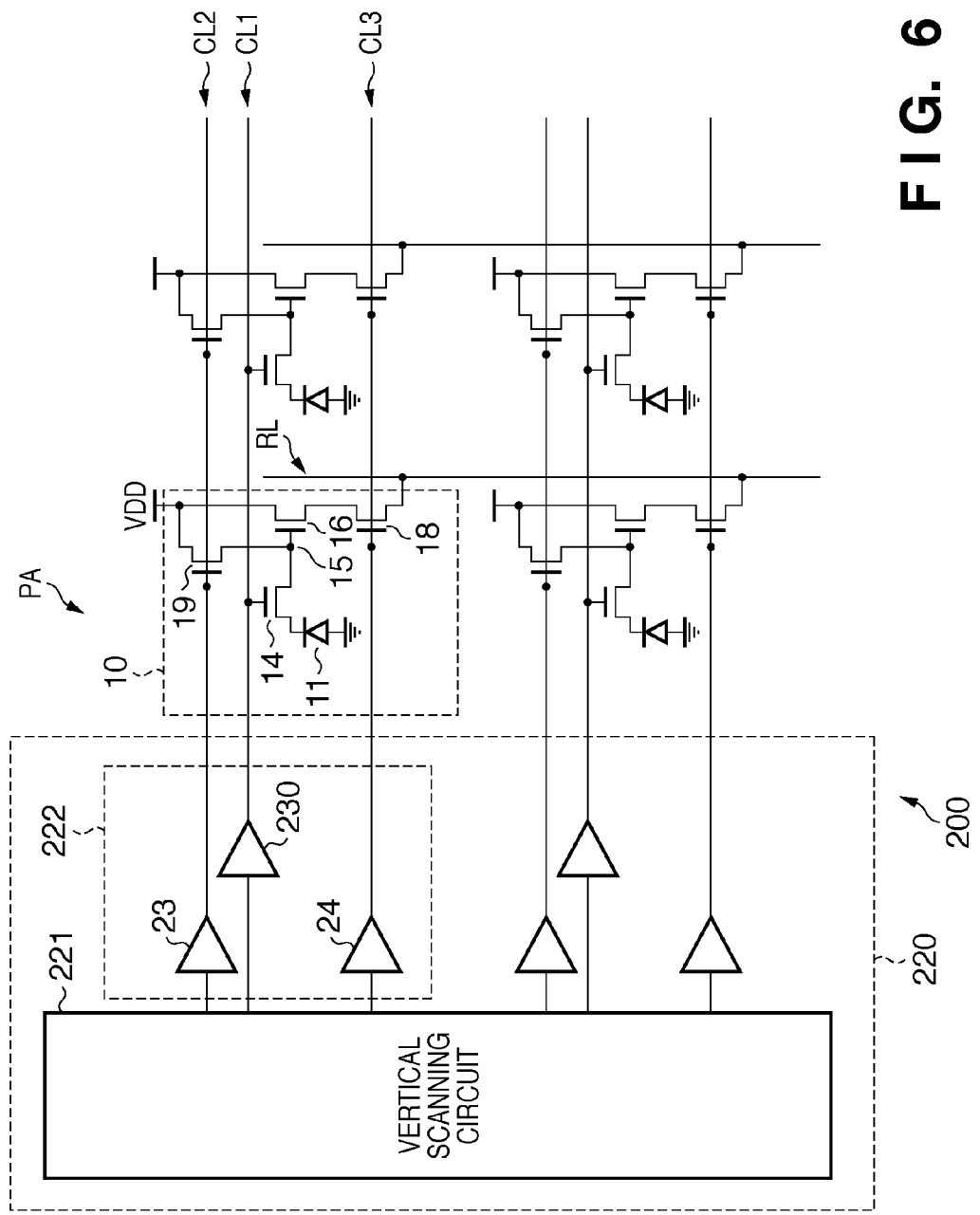
FIG. 6 is a circuit diagram showing the arrangement of an image sensing apparatus 200 according to the second embodiment of the present invention.

An image sensing apparatus 200 according to the second embodiment of the present invention will be explained next with reference to FIG. 6. FIG. 6 is a circuit diagram showing the arrangement of the image sensing apparatus 200 according to the second embodiment of the present invention. Parts different from those in the first embodiment will be mainly described hereinafter, and a description of the same parts will not be given.

Figure 7:
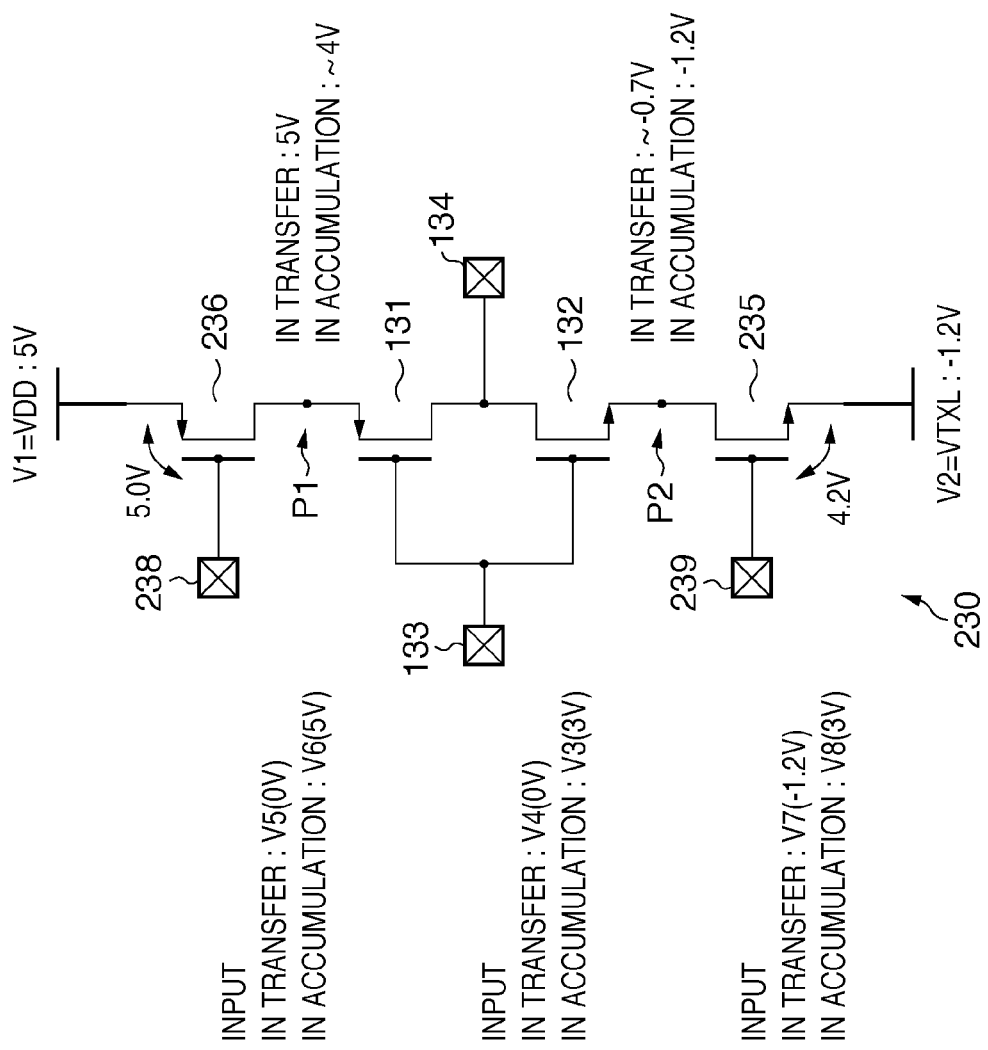
FIG. 7 is a circuit diagram showing the arrangement of a buffer circuit.

The image sensing apparatus 200 comprises a driving unit 220. The driving unit 220 includes a vertical scanning circuit 221 and buffer block 222. The buffer block 222 includes a buffer circuit 230. The buffer circuit 230 further includes a second PMOS transistor 236 and second NMOS transistor 235, as shown in FIG. 7. The second PMOS transistor 236 has its drain connected to the source of a first PMOS transistor 131, and its source supplied with a power supply voltage V1. The second NMOS transistor 235 has its drain connected to the source of a first NMOS transistor 132, and its source supplied with a reference voltage V2. FIG. 7 is a circuit diagram showing the arrangement of the buffer circuit.

The operation of the driving unit 220 is different from that in the driving unit 120 in the following points.

In supplying a transfer signal for turning on a transfer MOS transistor 14 to a transfer control line CL1 (in transfer), the vertical scanning circuit 221 further supplies voltages V5 and V7 to the buffer circuit 230 of the buffer block 222. The voltage V5 satisfies:

$$V2<V5<(V1+Vthp2) \tag{19}$$

where Vthp2 is the threshold voltage of the second PMOS transistor 236. Also, the voltage V7 satisfies:

$$V7<(V2+Vthn2) \tag{20}$$

where Vthn2 is the threshold voltage of the second NMOS transistor 235.

That is, the voltage V7 is supplied from an input terminal 239 shown in FIG. 7 to the gate of the second NMOS transistor 235. The second NMOS transistor 235 is turned off. Also, the voltage V5 is supplied from an input terminal 238 to the gate of the second PMOS transistor 236. The second PMOS transistor 236 is turned on.

Note that the first NMOS transistor 132 and second NMOS transistor 235 are OFF. Since the potential of a portion P2 upon turning off the first NMOS transistor 132 and second NMOS transistor 235 is lower than a gate potential V4 of the first NMOS transistor 132 by a threshold voltage Vthn1, (V4−Vthn1) is supplied to the source of the first NMOS transistor 132.

When, for example, the reference voltage V2 is −1.2V, and the threshold voltage Vthn1 is 0.7V, the source of the first NMOS transistor 132 is supplied with a voltage:

$$0V-0.7V=-0.7V \quad (21)$$

This makes it possible to further decrease the potential difference between the gate and source of the first NMOS transistor 132.

At this time, a voltage Vgs236 corresponding to the difference between the power supply voltage V1 and the voltage V5 is generated between the gate and source of the second PMOS transistor 236. When, for example, the power supply voltage V1 is 5V, and the voltage V5 is 0V, a voltage:

$$Vgs236=5V-0V=5V \quad (22)$$

is generated.

The voltage Vgs236 is equal to or less than the withstand voltage (e.g., 5V) of the gate insulating film of the second PMOS transistor 236. For this reason, the thickness of the gate insulating film of the second PMOS transistor 236 need not be increased. This makes it possible to ensure the driving capability of the buffer circuit 230 in turning off the transfer MOS transistor 14 (in accumulation).

Even when the withstand voltage of the gate insulating film of the second PMOS transistor 236 is set nearly equal to the difference (e.g., 5V) between the power supply voltage and the ground voltage, the gate insulating film of the second PMOS transistor 236 can be suppressed from being applied with an electric field larger than its withstand voltage. This makes it possible to prevent any damage to the gate insulating film of the second PMOS transistor 236.

In supplying a transfer signal for turning off the transfer MOS transistor 14 to the transfer control line CL1 (in accumulation), the vertical scanning circuit 221 further supplies voltages V6 and V8 to the buffer circuit 230 of the buffer block 222. The voltage V6 satisfies:

$$(V1+Vthp2)<V6 \quad (23)$$

Also, the voltage V8 satisfies:

$$(V2+Vthn2)<V8<V1 \quad (24)$$

That is, the voltage V6 is supplied from the input terminal 238 shown in FIG. 7 to the gate of the second PMOS transistor 236. The second PMOS transistor 236 is turned off. Also, the voltage V8 is supplied from the input terminal 239 to the gate of the second NMOS transistor 235. The second NMOS transistor 235 is turned on.

Note that the first PMOS transistor 131 and second PMOS transistor 236 are OFF. Since the potential of a portion P1 upon turning off the first PMOS transistor 131 and second PMOS transistor 236 is lower than a gate potential V3 of the first PMOS transistor 131 by a threshold voltage Vthp1, (V3−Vthp1) is supplied to the source of the first PMOS transistor 131.

When, for example, the power supply voltage V1 is 5V, and the threshold voltage Vthp1 is −1V, the source of the first PMOS transistor 131 is supplied with a voltage:

$$3V-(-1V)=4V \quad (25)$$

This makes it possible to further decrease the potential difference between the gate and source of the first PMOS transistor 131.

At this time, a voltage Vgs239 corresponding to the difference between the voltage V8 and the reference voltage V2 is generated between the gate and source of the second NMOS transistor 235. When, for example, the voltage V8 is 3V, and the reference voltage V2 is −1.2V, a voltage:

$$Vgs239=3V-(-1.2V)=4.2V \quad (26)$$

is generated.

The voltage Vgs239 is equal to or less than the withstand voltage (e.g., 5V) of the gate insulating film of the second NMOS transistor 235. For this reason, the thickness of the gate insulating film of the second NMOS transistor 235 need not be increased. This makes it possible to ensure the driving capability of the buffer circuit 230 in turning off the transfer MOS transistor 14 (in accumulation).

The thickness of the gate insulating film of the second NMOS transistor 235 can be decreased by setting its withstand voltage nearly equal to the value represented by equation (26).

When, for example, the electric field strength of the gate insulating film of the second NMOS transistor 235 is 5 MV/cm, the thickness of the gate insulating film required to set its withstand voltage to 4.2V is:

$$4.2(V) \div 5(MV/cm)=8.4 \text{ nm} \quad (27)$$

That is, the thickness of the gate insulating film of the second NMOS transistor 235 in this case can be smaller than that required to set its withstand voltage to 5V (see equation (3)). This makes it possible to improve the driving capability of the buffer circuit 230 in turning off the transfer MOS transistor 14 (in accumulation).

Even when the withstand voltage of the gate insulating film of the second NMOS transistor 235 is set nearly equal to the difference (e.g., 5V) between the power supply voltage and the ground voltage, the gate insulating film of the second NMOS transistor 235 can be suppressed from being applied with an electric field larger than its withstand voltage. This makes it possible to prevent any damage to the gate insulating film of the second NMOS transistor 235.

Still better, since this arrangement can turn off the second NMOS transistor and second PMOS transistor, it is possible to provide a buffer circuit 230 which suppresses a leakage current as a whole.

It should be noted that the driving unit 220 may perform the following driving. Let TWV be the maximum electric field applied to the gate insulating film of the transfer MOS transistor, and BWV2 be the largest value of maximum electric fields applied to the gate insulating films of the second PMOS transistor 236, first PMOS transistor 131, first NMOS transistor 132, and second NMOS transistor 235. Then, the driving unit 220 performs driving to satisfy $$BWV2 \leq TWV \quad (28)$$

The driving unit 220 may perform driving to satisfy $$(V8-V2) \leq (Vdd-Vss) \quad (29)$$

that is, $$V8 \leq (Vdd-Vss+VTXL) \quad (30)$$

and $$(V3-V2) \leq (Vdd-Vss) \quad (31)$$

that is, $$V3 \leq (Vdd - Vss + VTXL) \tag{32}$$

and $$(V5-V1) \geq (Vss-Vdd) \tag{33}$$

that is, $$V5 \geq Vss \tag{34}$$

and $$(V4-V1) \geq (Vss-Vdd) \tag{35}$$

that is, $$V4 \geq Vss \tag{36}$$

In this case, although the amplitude of the output voltage of the buffer circuit 230 is (VDD−VTXL=V1−V2), only a potential difference equal to or less than (Vdd−Vss) is applied to the gate insulating films of the transistors in the buffer circuit 230. This makes it possible to achieve a good transfer characteristic of the image sensing apparatus 200 and improve the driving capability of the buffer circuit 230.

Figure 8:
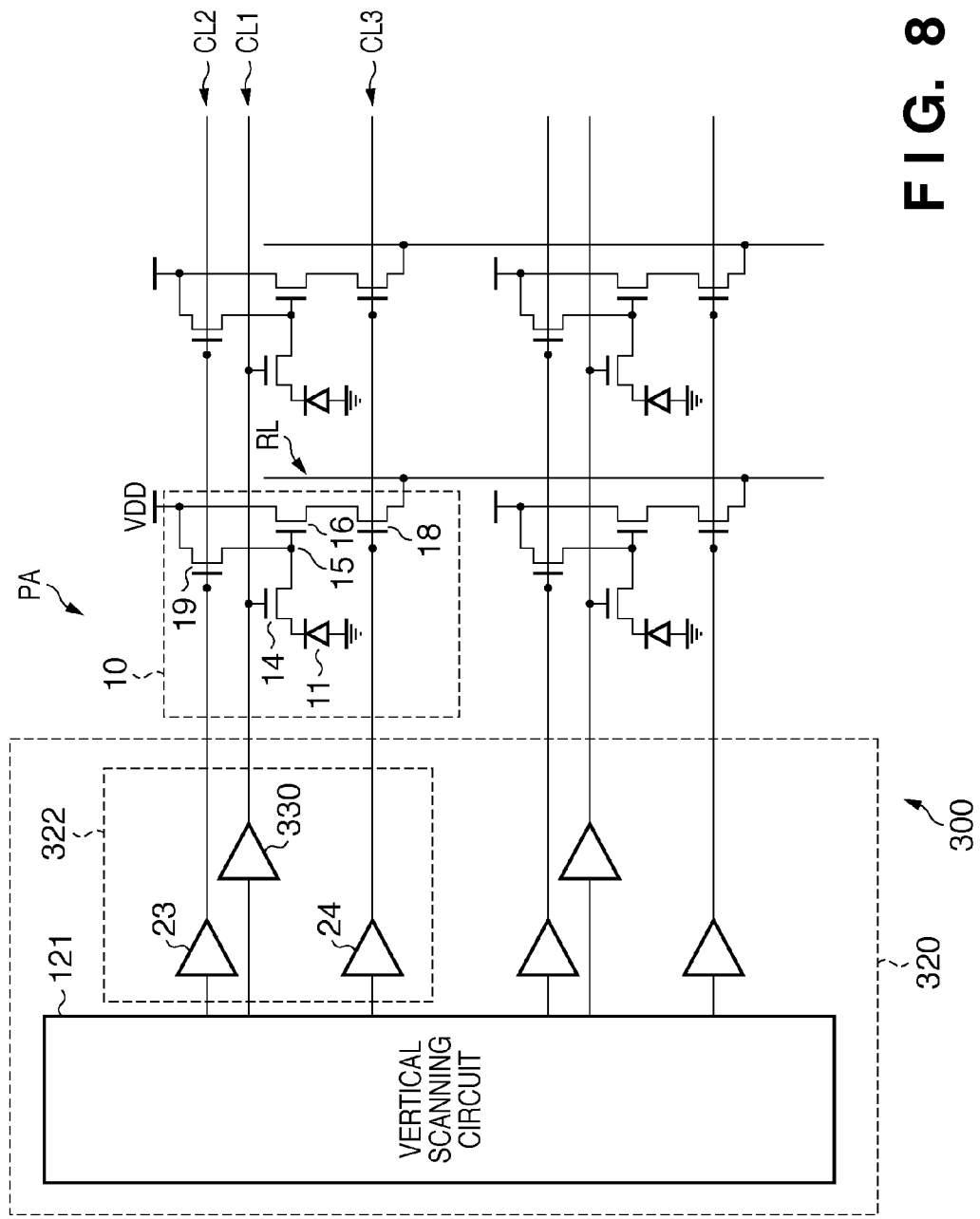
FIG. 8 is a circuit diagram showing the arrangement of an image sensing apparatus 300 according to the third embodiment of the present invention.

An image sensing apparatus 300 according to the third embodiment of the present invention will be explained next with reference to FIG. 8. FIG. 8 is a circuit diagram showing the arrangement of the image sensing apparatus 300 according to the third embodiment of the present invention. Parts different from those in the first and second embodiments will be mainly described hereinafter, and a description of the same parts will not be given.

Figure 9:
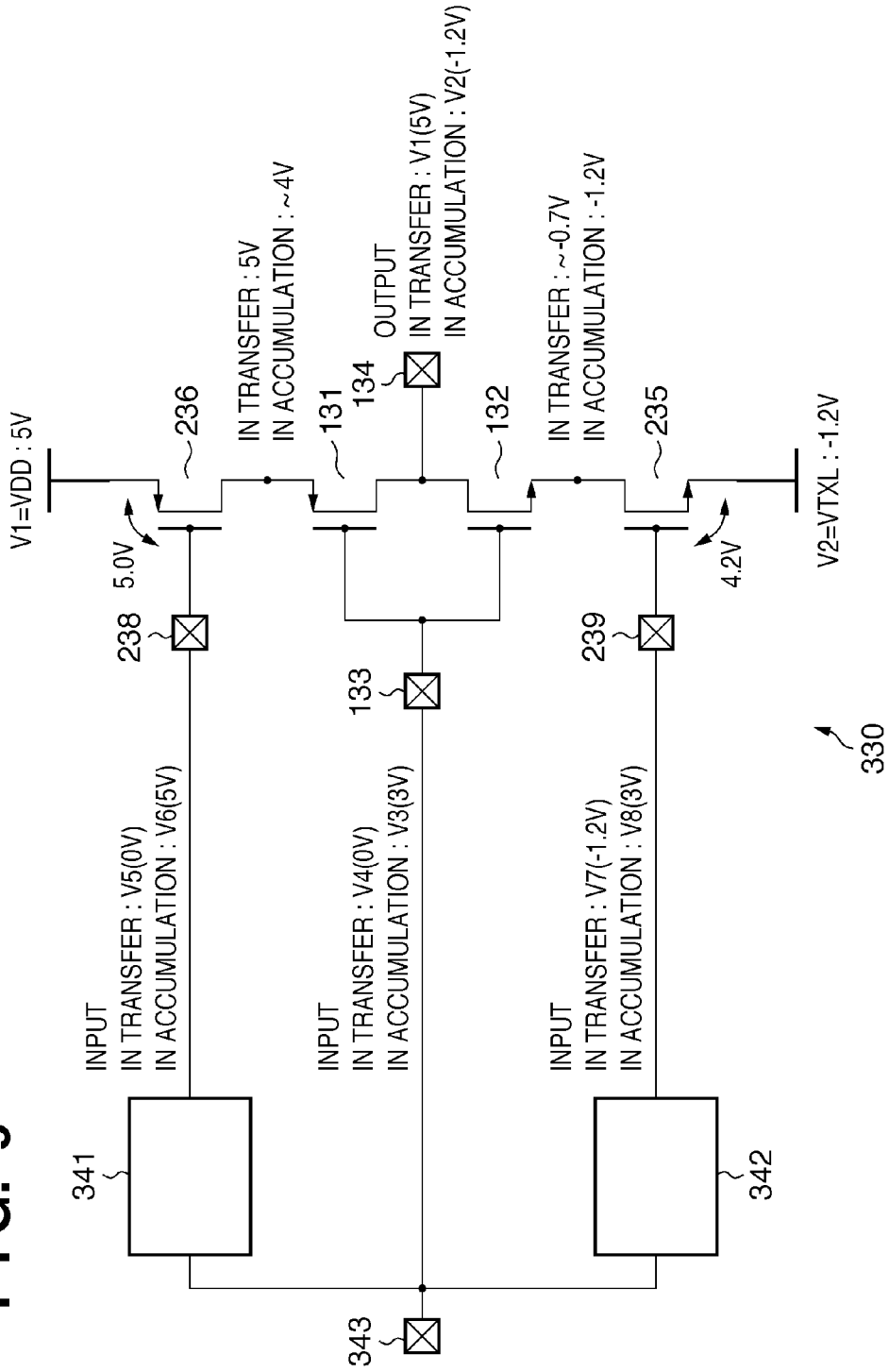
FIG. 9 is a circuit diagram showing the arrangement of a buffer circuit.

The image sensing apparatus 300 comprises a driving unit 320. The driving unit 320 includes a vertical scanning circuit 121 and buffer block 322. The buffer block 322 includes a buffer circuit 330. The buffer circuit 330 further includes an input terminal 343 and level shift circuits 341 and 342, as shown in FIG. 9. The input terminal 343 is inserted upstream of input terminals 238, 133, and 239 as a common input terminal. FIG. 9 is a circuit diagram showing the arrangement of the buffer circuit.

The level shift circuit 341 is inserted between the input terminals 343 and 238. The level shift circuit 341 shifts the level of a signal input from the input terminal 343, and supplies the resultant signal to the input terminal 238. For example, the level shift circuit 341 shifts the level of a voltage V4 (0V) by 0V in transfer, and supplies a voltage V5 (0V) to the input terminal 238. For example, the level shift circuit 341 shifts the level of a voltage V3 (3V) by +2V in accumulation, and supplies a voltage V6 (5V) to the input terminal 238.

The level shift circuit 342 is inserted between the input terminals 343 and 239. The level shift circuit 342 shifts the level of a signal input from the input terminal 343, and supplies the resultant signal to the input terminal 239. For example, the level shift circuit 342 shifts the level of a voltage V4 (0V) by −1.2V in transfer, and supplies a voltage V7 (−1.2V) to the input terminal 239. For example, the level shift circuit 342 shifts the level of a voltage V3 (3V) by 0V in accumulation, and supplies a voltage V8 (3V) to the input terminal 239.

Figure 10:
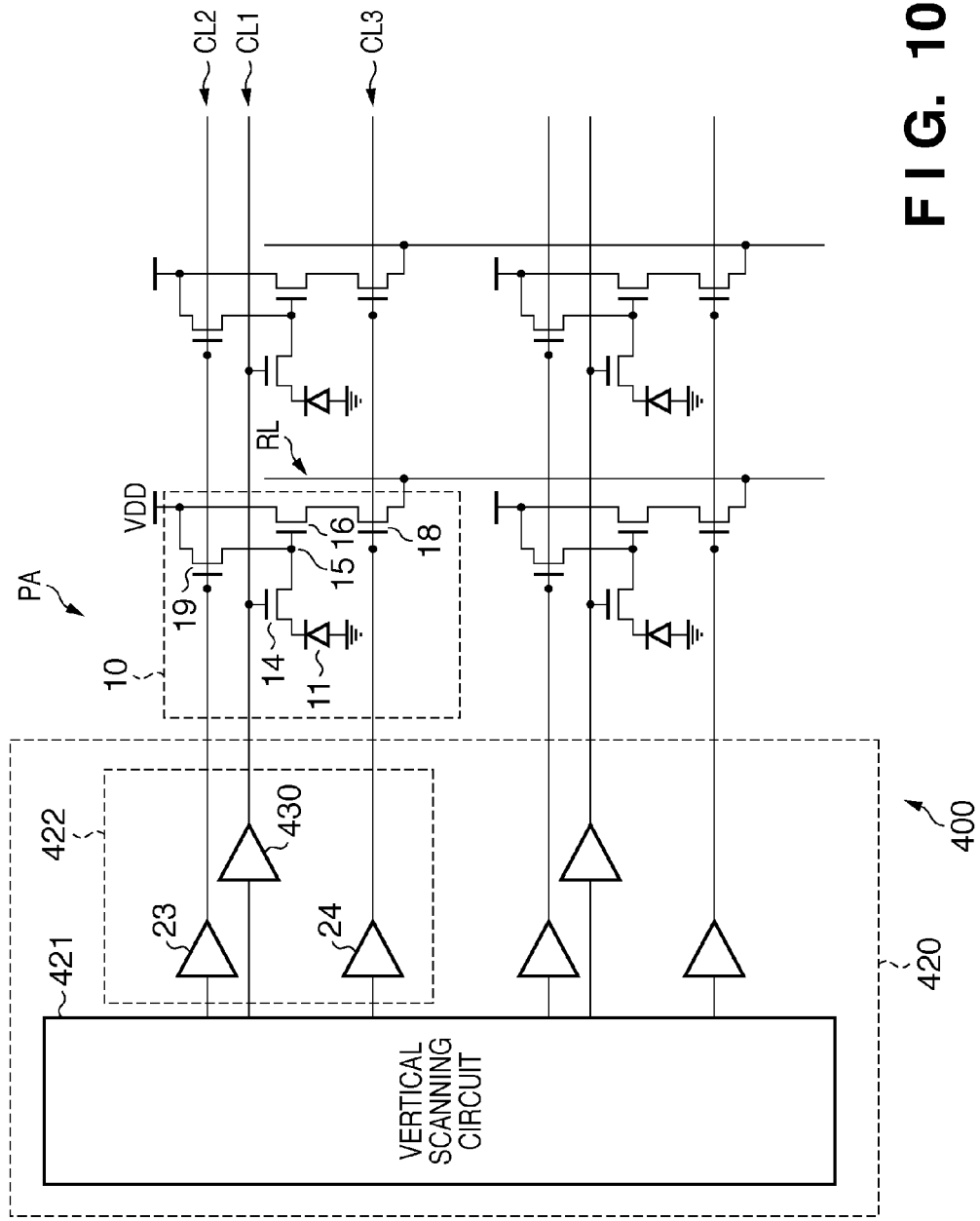
FIG. 10 is a circuit diagram showing the arrangement of an image sensing apparatus 400 according to the fourth embodiment of the present invention.

An image sensing apparatus 400 according to the fourth embodiment of the present invention will be explained next with reference to FIG. 10. FIG. 10 is a circuit diagram showing the arrangement of the image sensing apparatus 400 according to the fourth embodiment of the present invention. Parts different from those in the first to third embodiments will be mainly described hereinafter, and a description of the same parts will not be given.

Figure 11:
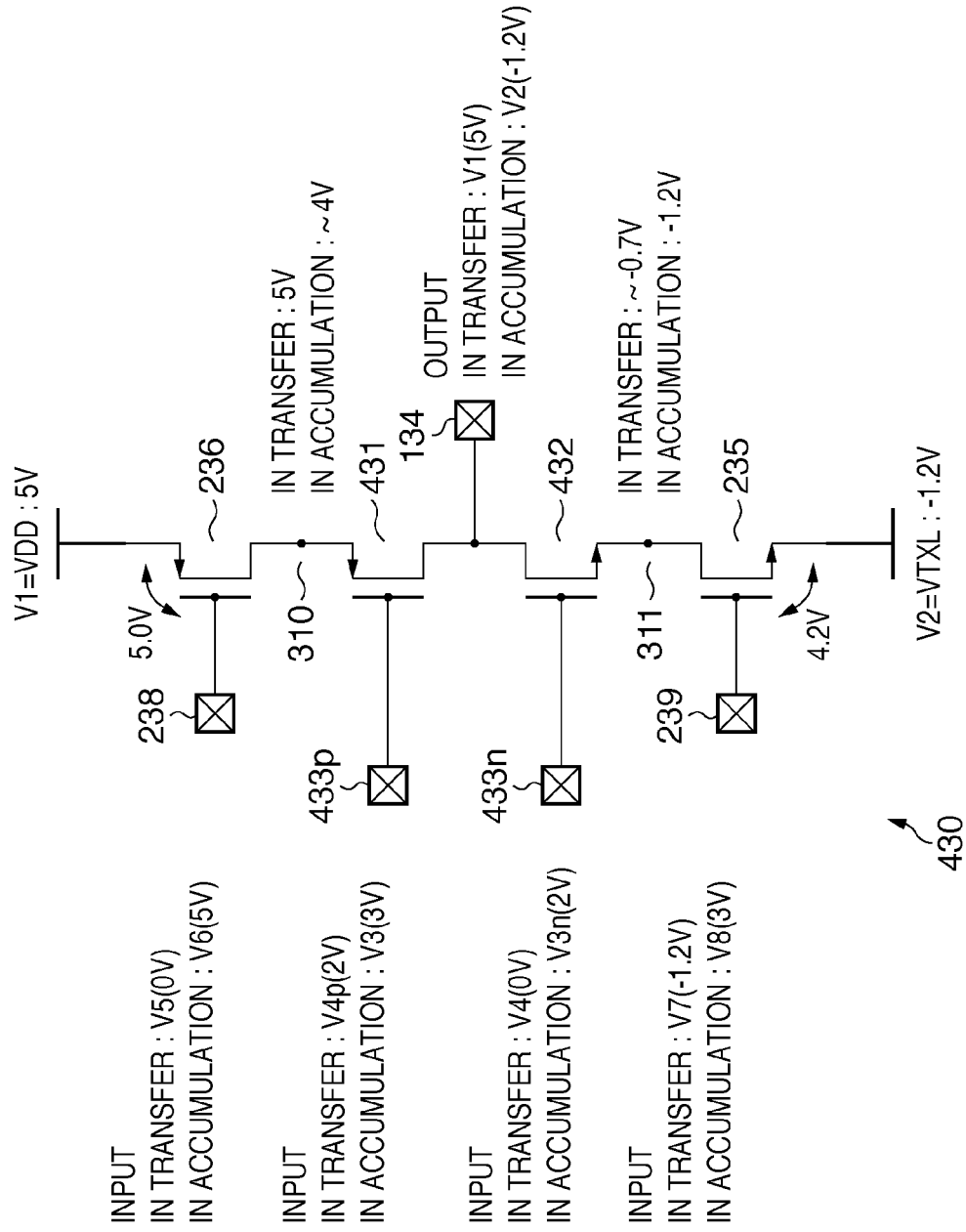
FIG. 11 is a circuit diagram showing the arrangement of a buffer circuit.

The image sensing apparatus 400 comprises a driving unit 420. The driving unit 420 includes a vertical scanning circuit 421 and buffer block 422. The buffer block 422 includes a buffer circuit 430. The buffer circuit 430 further includes a first PMOS transistor 431 and first NMOS transistor 432, as shown in FIG. 11. The gates of the first PMOS transistor 431 and first NMOS transistor 432 are connected to different input terminals 433p and 433n. FIG. 11 is a circuit diagram showing the arrangement of the buffer circuit.

The operation of the driving unit 420 is different from those in the driving units 120, 220, and 320 in the following points.

In supplying a transfer signal for turning on a transfer MOS transistor 14 to a transfer control line CL1 (in transfer), the vertical scanning circuit 421 supplies a voltage V4p to the buffer circuit 430 of the buffer block 422 in addition to a voltage V4. The voltage V4p satisfies:

$$(V4p-V1) \leq Vthp1 \tag{37}$$

That is, the voltage V4p is supplied from the input terminal 433p shown in FIG. 11 to the gate of the first PMOS transistor 431. The first PMOS transistor 431 is turned on. The power supply voltage V1 is supplied, as a transfer signal for turning on the transfer MOS transistor 14, from the source of the first PMOS transistor 431 to an output terminal 134 via the drain of the first PMOS transistor 431, as in the image sensing apparatus 1.

When, for example, the power supply voltage V1 is 5V, and the threshold voltage Vthp1 is −1V, according to relation (37), the voltage V4p need only satisfy:

$$V4p \leq 5V + (-1V) = 4V \tag{38}$$

and is, e.g., 2V.

In supplying a transfer signal for turning off the transfer MOS transistor 14 to a transfer control line CL1 (in accumulation), the vertical scanning circuit 421 supplies a voltage V3n to the buffer circuit 430 of the buffer block 422 in addition to a voltage V3. The voltage V3n satisfies:

$$Vthn1 \leq (V3n-V2) \tag{39}$$

That is, the voltage V3n is supplied from the input terminal 433n shown in FIG. 11 to the gate of the first NMOS transistor 432. The first NMOS transistor 432 is turned on. The reference voltage V2 is supplied, as a transfer signal for turning off the transfer MOS transistor 14, from the source of the first NMOS transistor 432 to the output terminal 134 via the drain of the first NMOS transistor 432, as in the image sensing apparatus 1.

When, for example, the reference voltage V2 is −1.2V, and the threshold voltage Vthn1 is 0.5V, according to relation (39), the voltage V3n need only satisfy:

$$V3n \geq -1.2V + 0.5V = -0.7V \tag{40}$$

and is, for example, 2V.

Such electrode division allows the driving unit 420 to perform driving so as to satisfy a voltage V3=3V and a voltage V3n=2V in turning off the transfer MOS transistor 14 by supplying the reference voltage V2 to it (in accumulation). With this operation, the first NMOS transistor 432 can have a relatively high ON resistance so that the gate of the transfer MOS transistor 14 is turned off slowly. This makes it possible to reduce any random noise generated upon reading out the electric charge of the photoelectric conversion unit 11.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-202234, filed Aug. 2, 2007, which is hereby incorporated by reference herein in its entirety.

What is claimed is:

1. An image sensing apparatus comprising:
a pixel; and
a driving unit which drives the pixel,
wherein the pixel includes a photoelectric conversion unit, a charge-voltage converter which converts a signal based on an electric charge accumulated by the photoelectric conversion unit into a voltage, and a transfer MOS transistor which transfers the electric charge accumulated by the photoelectric conversion unit to the charge-voltage converter,
wherein the driving unit includes a buffer circuit configured to supply a transfer signal to a transfer control line connected to a gate of the transfer MOS transistor,
wherein the buffer circuit includes
a first PMOS transistor having a drain connected to the transfer control line, and a source supplied with a power supply voltage V1,
a first NMOS transistor having a drain connected to the transfer control line and the drain of the first PMOS transistor, and a source supplied with a reference voltage V2 with a sign opposite to a sign of the power supply voltage V1,
a second PMOS transistor having a drain connected to the source of the first PMOS transistor, and a source supplied with the power supply voltage V1, and
a second NMOS transistor having a drain connected to the source of the first NMOS transistor, and a source supplied with the reference voltage V2,
wherein V3 is a voltage supplied to a gate of the first NMOS transistor to supply a transfer signal for turning off the transfer MOS transistor to the transfer control line,
wherein V4 is a voltage supplied to a gate of the first PMOS transistor to supply a transfer signal for turning on the transfer MOS transistor to the transfer control line,
wherein Vthp1 is a threshold voltage of the first PMOS transistor,
wherein Vthn1 is a threshold voltage of the first NMOS transistor,
wherein V6 and V8 are voltages supplied to gates of the second PMOS transistor and the second NMOS transistor to supply a transfer signal for turning off the transfer MOS transistor to the transfer control line,
wherein V5 and V7 are voltages supplied to gates of the second PMOS transistor and the second NMOS transistor to supply a transfer signal for turning on the transfer MOS transistor to the transfer control line,
wherein Vthp2 is a threshold voltage of the second PMOS transistor,
wherein Vthn2 is a threshold voltage of the second NMOS transistor, and
wherein $(V2+Vthn1) < V3 < V1$ $V2 < V4 < (V1+Vthp1)$ $V2 < V5 < (V1+Vthp2) < V6$ and $V7 < (V2+Vthn2) < V8 < V1$.

2. The apparatus according to claim 1, wherein
V4p is a voltage supplied to the gate of the first PMOS transistor to supply a transfer signal for turning on the transfer MOS transistor to the transfer control line, and V3n is a voltage supplied to the gate of the first NMOS transistor to supply a transfer signal for turning off the transfer MOS transistor to the transfer control line, and wherein $(V4p-V1) \leq Vthp1$ and $Vthn1 \leq (V3n-V2)$.

3. The apparatus according to claim 1, wherein
Vwe1 is a well potential of the transfer MOS transistor, and wherein $(V3-V2) \leq (V1-Vwe1)$ and $-(V4-V1) \leq (V1-Vwe1)$.

4. The apparatus according to claim 1, wherein
TWV is a maximum electric field applied to a gate film of the transfer MOS transistor, and BWV1 is a larger value of maximum electric fields applied to gate films of the first PMOS transistor and the first NMOS transistor, and wherein $BWV1 \leq TWV$.

5. The apparatus according to claim 1, wherein
TWV is a maximum electric field applied to a gate film of the transfer MOS transistor, and BWV2 is a largest value of maximum electric fields applied to gate films of the second PMOS transistor, the first PMOS transistor, the first NMOS transistor, and the second NMOS transistor, and wherein $BWV2 \leq TWV$.

6. An image capturing system comprising:
an image sensing apparatus defined in claim 1;
an optical system configured to form an image on an image sensing plane of the image sensing apparatus; and
a signal processing unit configured to process a signal output from the image sensing apparatus to generate image data.

* * * * *